Jan. 5, 1943. A. A. OLSON 2,307,534
CALCULATING DEVICE
Filed May 23, 1940
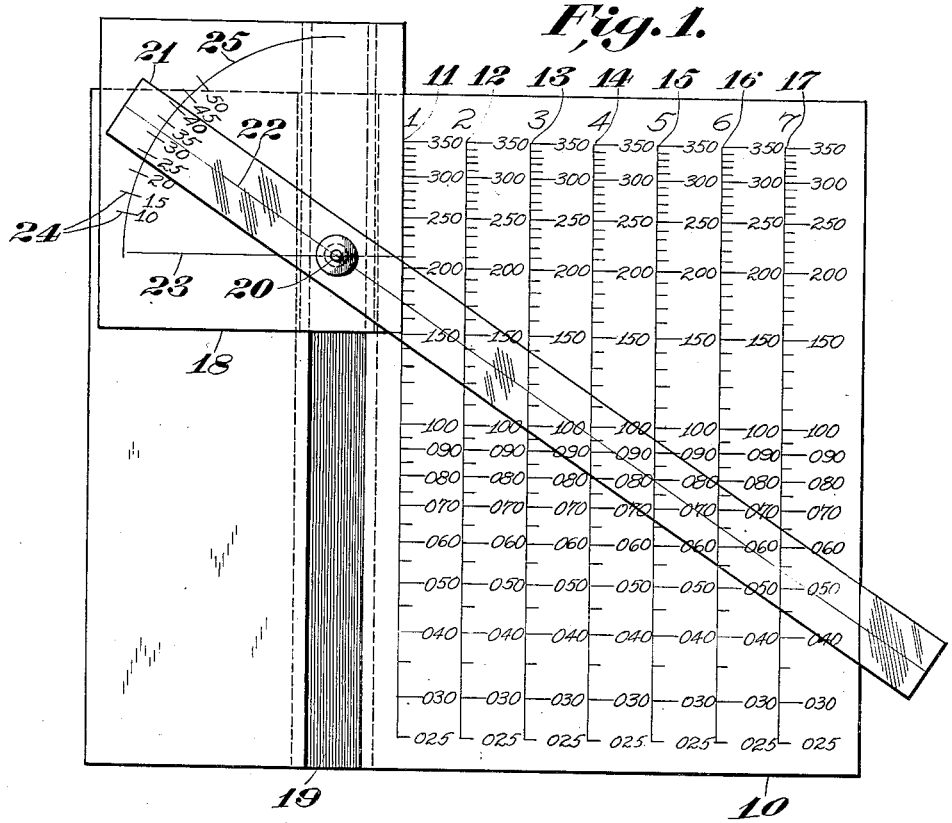
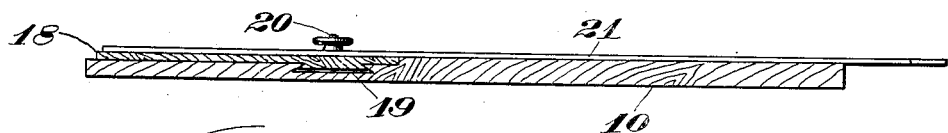
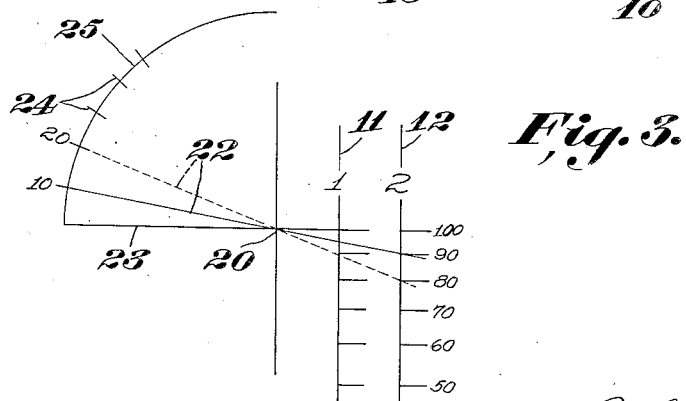
Inventor
*A. A. Olson.*
By *R. S. A. Dougherty.*
Attorney Patented Jan. 5, 1943

2,307,534

UNITED STATES PATENT OFFICE 2,307,534

CALCULATING DEVICE

Albert A. Olson, Johnstown, Pa., assignor to Bethlehem Steel Company, a corporation of Pennsylvania Application May 23, 1940, Serial No. 336,686

9 Claims. (Cl. 235—61)

My invention relates to calculating instruments and has as its general object to provide a calculator which will perform at a single setting two or more calculations which ordinarily must be performed successively.

Specifically stated my invention has been developed for the purpose of calculating the sizes of dies to be used in wire drawing, although the device is not limited to this particular purpose. For example, a common problem to operators of wire drawing machines is the following: to determine the die sizes necessary to produce a wire having a diameter of .080" from rod stock having a diameter of .210", using five dies, and with a uniform reduction in area of the wire in each die. One way to calculate the size of each die in order to achieve this result is to subtract the log of .080 from the log of .210 and divide the difference by five. The resulting figure is substracted from the log of .210, which gives the log of the figure representing the diameter of the first die. From this log the figure resulting from the above division is again subtracted, giving the log of the number representing the diameter of the second die, and so on until the size of all of the dies has been calculated.

My invention consists of a calculator which will solve this and other problems of a similar nature at a single setting.

My invention will be more readily understood by reference to the following description and claims, and to the drawing, in which Figure 1 represents a plan view of my device;

Figure 2 represents an end view of the device; and

Figure 3 is a diagrammatic view illustrating certain features of my device.

Referring to Figures 1 and 2, the instrument comprises a base 10 upon which a plurality of identical logarithmic scales 11, 12, 13, 14, 15, 16 and 17 are located parallel to each other in such relationship that a straight line passing through identical marks on any two scales will pass through the same mark on the remaining scales. Each scale is equally spaced from the adjacent scales. Located adjacent said scales is the slider 18 which operates in the dovetailed slot 19. Pivoted on the slider 18 at the point 20 is the arm 21 which is made of transparent Celluloid or the like. The line 22 is suitably scribed on the arm 21 and passes through the pivot point 20, thus forming a straightedge pivoted on said pivot point 20. The distance from pivot point 20 to scale 11 is the same as the distance from scale 11 to scale 12. The base line 23 extends on the slider 18 from the pivot point 20 to the scale 11 and is perpendicular to said scale 11. The slider 18 also carries the scale 24 which for purposes of compactness is in form of an arc 25 described around pivot point 20 as a center.

The scales 11 to 17 are graduated to represent diameters of wire. As shown in Figure 1, said scales read in diameters ranging from .350" to .025". This range is an arbitrary one and may be varied in accordance with sizes of wire ordinarily encountered in the plant in which the device is intended to be used. As heretofore noted, said scales are logarithmic scales.

The scale 24 is also a logarithmic scale graduated to represent the percentage of reduction of area of the wire resulting from a given reduction in its diameter. The scale may be calculated in a number of ways. A simple way to lay out scale 24 is as follows:

Position the slider so that the base line 23 is opposite the figure .100 on scale 11. Rotate straightedge 22 so that it intersects scale 12 at any given point, for example .090. With the straightedge in this position the reduction in area of wire of the diameters shown on any two successive scales at the point where the straightedge 22 intersects said scales will be equal to the difference between 100% and 90%, or 10%. The point at which straightedge 22 intersects arc 25 will therefore represent a reduction in area of 10%. In the same manner the point representing a reduction of 20% in area between successive dies is located on arc 25 by rotating the straightedge 22 until it intersects the point .080 on scale 12. Other points on arc 25 are similarly located. Figure 3 illustrates this diagrammatically.

The operation of the calculator may now be explained. Since the calculator is capable of performing a number of different but related calculations, its operation can best be explained by means of examples.

*Problem 1.*—The rod diameter is .210". It is desired to produce a wire having a diameter of .080" using five dies, with a uniform percentage of area reduction in each die. In order to determine the proper die sizes to accomplish this result, move slider 18 until base line 23 intersects scale 11 at .210. Rotate straightedge 22 until it intersects scale 15 at .080. The point at which straightedge 22 intersects scales 11, 12, 13, 14 and 15 indicates the die sizes to be used, namely, No. 1—.173"; No. 2—.143"; No. 3—.118"; No. 4—.097"; No. 5—.080". Reference to scale 24 shows that the reduction in area of the wire in each successive die will be approximately 32%. Figure 1 shows the device set to perform this calculation.

*Problem 2.*—The rod size is .262″. It is desired to reduce this to a wire size of .105″ without exceeding a 25% reduction in area in any one die. In order to obtain the number of dies required and the size of each die, move slider 18 until the base line 23 intersects scale 11 at .262. Rotate straightedge 22 until it intersects scale 24 at 25%. Straightedge 22 will intersect scale 16 at .113″ and scale 17 at .098″. This indicates that seven dies will be required. Rotate straightedge 22 until it intersects scale 17 at .105″. The die sizes will now be indicated at the points at which straightedge 22 intersects scales 11 to 17.

*Problem 3.*—It is desired to determine the percentage of reduction in area produced by a die of given diameter on a rod of given diameter. Set base line 23 to intersect scale 11 at the point representing the rod diameter. Rotate straightedge 22 until it intersects scale 11 at the point representing the die diameter. The percentage of reduction in area may be read at the point where straightedge 22 intersects scale 24.

*Problem 4.*—It is desired to produce wire having a diameter of .091″. The physical requirements are such that six dies are to be used, with a 30% reduction in area at each hole. In order to determine the required rod size and die sizes set the straightedge 22 to intersect scale 24 at 30%. Move slider 18 until straightedge 22 intersects scale 16 at .091″. The point at which base line 23 intersects scale 11 will indicate the required rod size, .262″, and the points at which straightedge 22 intersects scales 11 to 16 will indicate the required die sizes.

The above problems are only indicative of the problems which can be solved through the use of my invention.

My invention is capable of being modified in various respects without departing from the spirit thereof. For example, scale 11 is adapted to be read against both straightedge 22 and base line 23. Obviously another scale might be provided against which base line 23 might be read. Again, scale 24 is graduated to indicate the reduction in area resulting from a given reduction in diameter as shown on any two successive scales of the scales 11 to 17. Obviously scale 24 could be modified to show other relationships between various points on the scales 11 to 17. Again, scales 11 to 17 are so laid out that a straight line between identical points on any two scales is perpendicular to the scales themselves. As a result all readings between straightedge 22 and said scales must be made at an angle, which increases the chance for error in the readings. This disadvantage may be overcome in part by moving each successive scale upwardly an equal amount above the preceding scale subject only to the limitation that a straight line intersecting identical points on any two scales shall intersect the same point on all of the other scales. By so doing the normal range of movement of straightedge 23 can be brought more nearly perpendicular to scales 11 to 17. Again, scales 11 to 17 are shown as equidistant with the result that straightedge 22 always shows on said scales an equal percentage of area reduction from die to die. It is frequently desirable, however, to vary the percentage of area reduction from die to die. For example, it may be desired to have a reduction of 10% in each of the first four dies, and a reduction of 5% in the fifth die. In order to adapt the device to calculate the die sizes necessary to produce a wire of given diameter under these conditions it is only necessary to make scale 15, representing the fifth die, adjustable laterally towards scale 14. By moving scale 15 half-way towards scale 14, straightedge 22 will indicate a reduction in area only 50% of that produced in a die of the size shown on scale 14. Accordingly, to solve the problem just given, move scale 15 half-way towards scale 14; set the straightedge 22 to read 10% on scale 24. Move the slider 18 until the straightedge 22 intersects scale 15 at the desired wire size. In this position the straightedge will show on scales 11, 12, 13 and 14 die sizes in which the percentage of reduction of area will be 10% for each die while scale 15 will show the size of the fifth die, in which the area of reduction will be 5%.

Having thus described my invention, what I claim as new and desire to secure by Letters Patent is:

1. A calculator comprising a base, a plurality of equidistantly spaced logarithmic scales thereon graduated to indicate diameters and so located that a straight line intersecting identical points on any two scales will also intersect the same point on the remainder, a slider mounted on said base adjacent said scales and movable in a direction parallel thereto, a logarithmic scale on said slider, and a straightedge pivoted on said slider and adapted to intersect said scales on said base and said slider, the scale on said slider being graduated to indicate the area relationship between any two circles having the diameters indicated by the points at which the straightedge intersects adjacent scales on said base.

2. A calculator comprising a base, a plurality of identical, equidistantly spaced logarithmic scales on said base so located and graduated that a straight line intersecting identical points on any two scales will intersect the same point on the remainder of said scales, a slider mounted on said base adjacent said scales and movable in a direction parallel thereto, a logarithmic scale on said slider, a straightedge pivoted on said slider and adapted to intersect the scales on said base and said slider, the scale on said slider being graduated to indicate relationships between points on adjacent scales on said base intersected by said straightedge.

3. A calculator comprising a base, a plurality of parallel, equidistantly spaced scales on said base and a straightedge mounted on a slider movable in a direction parallel to said scales, said straightedge being adapted to intersect said scales, said scales being so located and graduated that points intersected by said straightedge on any two adjacent scales will bear the same ratio to each other as points intersected by said straightedge on any other two adjacent scales.

4. A calculator comprising a base, a plurality of parallel, equidistantly spaced scales on said base, a slider mounted on said base and movable in a direction parallel to said scales and a straightedge pivoted on said slider and adapted to intersect said scales, said scales being so located and graduated that points intersected by said straightedge on any two adjacent scales will bear the same ratio to each other as points intersected by said straightedge on any other two adjacent scales and an additional scale adapted to be intersected by said straightedge and graduated to indicate relationships between points on the first mentioned scales which relationships are dependent on said ratios.

5. A calculator comprising a plurality of parallel, equidistantly spaced logarithmic scales so graduated that a straight line passing through identical points on any two scales will pass through the same point on the remaining scale or scales, a slider movable in a direction parallel to said scales, a straightedge pivoted on said slider and a scale on said slider for determining relationships between points on any two successive scales on said base intersected by said straightedge.

6. In a calculator a stationary scale, a second stationary scale parallel thereto, a scale movable in a direction parallel to said stationary scales, and a straightedge movable with said movable scale and pivoted thereto and readable on all of said scales, the distance between the two stationary scales being the same as the distance between the pivotal point of the slider and the adjacent stationary scale, said movable scale being graduated to indicate relationships between points on said stationary scales intersected by said straightedge.

7. A base, a plurality of parallel equidistantly spaced logarithmic scales upon the base so arranged that a straight line passing through identical points on any two scales will intersect the remaining scales at the same point, an indicator adapted to locate known points on two of said scales whereby unknown points on the remaining scales will be located.

8. A calculator comprising a base, a plurality of parallel, equidistantly spaced scales located on said base, a slider mounted on said base and movable in a direction parallel thereto and readable against one of said scales, a straightedge pivoted on said slider and adapted to be read against one of said scales and a scale on said slider against which said straightedge may be read.

9. A calculator for the solution of a problem containing a number of variables at least one of which is unknown, said calculator comprising a body, a slider mounted on said body, a logarithmic scale on said slider and parallel logarithmic scales on said body representing said variables, said logarithmic scales being also parallel to the direction of movement of said slider, and an indicator pivoted on said slider adapted to locate known points on two of said scales and to locate on the remaining scales the unknown points.

ALBERT A. OLSON.